United States Patent [19]
Favata et al.

[11] 3,912,986
[45] Oct. 14, 1975

[54] HIGH VOLTAGE CAPACITOR

[75] Inventors: Joseph N. Favata; Edgar I. Biondi, both of Rome, N.Y.

[73] Assignee: The United States of America as represented by the Secretary of the Air Force, Washington, D.C.

[22] Filed: Jan. 16, 1975

[21] Appl. No.: 541,536

[52] U.S. Cl. ............................................. 317/242
[51] Int. Cl.² ........................................ H01G 4/28
[58] Field of Search .................................. 317/242

[56] References Cited
UNITED STATES PATENTS
1,266,377 5/1918 Alexanderson ..................... 317/242
1,758,968 5/1930 Pickard ............................... 317/242

*Primary Examiner*—E. A. Goldberg
*Attorney, Agent, or Firm*—Joseph E. Rusz; George Fine

[57] ABSTRACT

A high voltage capacitor of several sections is formed by supporting a series of cylindrical electrodes longitudinally displaced along the axis within an external cylindrical container which is the other electrode. Connection to each of the several internal electrodes is made by introducing an insulated conductor through a sealed channel through the wall of the external cylindrical container. The entire assembly is filled with a dielectric insulating fluid.

3 Claims, 2 Drawing Figures

HIGH VOLTAGE CAPACITOR

STATEMENT OF GOVERNMENT INTEREST

The invention described herein may be manufactured and used by or for the Government for Governmental purposes without the payment of any royalty thereon.

BACKGROUND OF THE INVENTION

The present invention relates to high voltage capacitors, and particularly to capacitors capable of withstanding very high voltage pulses.

High voltage capacitors utilized in the prior art have limitations as to size, cost, and the ability to operate over a long period of time while being pulsed at very high voltages, for example, in the region of 150 KV. The present invention provides an extremely compact high voltage capacitor of low inductance, low volume, and low cost. It has direct applications in the pulse modulator section of high power air force radar, laser or radio communication systems (e.g., pulse-modulated).

SUMMARY OF THE INVENTION

A high voltage capacitor is provided. The capacitor is formed by two coaxially positioned metal cylinders disposed one within the other and separated by a dielectric. The outer electrode is one terminal of the capacitor and a connection is taken radially of axis from the inner conductor to form the second contact. Insulating spacers may be used to separate the inner and outer sleeves. In addition, a centrally disposed post may be employed so that other spacers mounted between the post and the inner surface of the inner sleeve may provide additional support. A multisection of these capacitors is formed by supporting a series of the individual units along the same axis within an external cylinder which serves as a common electrode.

DETAILED DESCRIPTION OF THE PREFERRED EMBODIMENT

Figure 1:
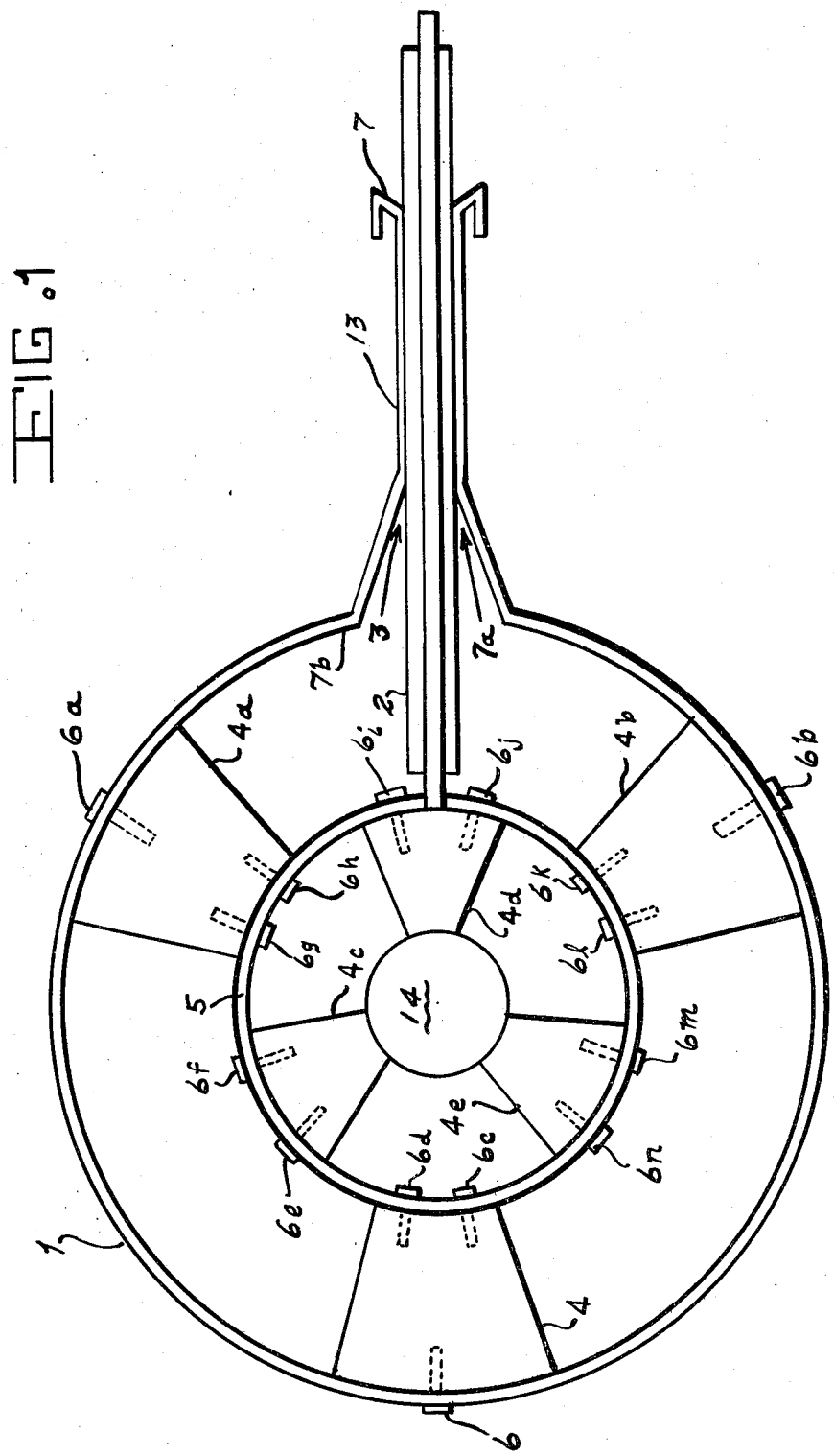
FIG. 1 shows a top view of a preferred embodiment of the high voltage capacitor of the present invention.

Now referring in detail to FIG. 1, the capacitor is formed by two coaxially positioned metal cylinders one within the other, separated by a fluid dielectric not shown. Outer cylindrical electrode 1 acts as one terminal of the capacitor as well as the container for a conventional dielectric insulating fluid. Connection to inner electrode 5 (inner cylinder) is provided by polyethylene insulated connecting lead 2, leading through liquid sealed channel 3 to the exterior surface of inner cylinder 5. The surface 5 near points 7, 7a and 7b of high electrostatic field intensity is rounded to minimize the tendency for high voltage breakdown.

To insure freedom from movement in vibrational environment additional support for inner coaxial electrode 5 is provided in the form of insulating central rod support 14, insulating spacer blocks 4, 4a, 4b, 4c, 4d, and 4e. These insulating spacer blocks are securely fastened to both the outer and inner cylindrical electrodes 1 and 5 with screws 6 through 6n. The screws are made from insulating material such as nylon.

The electrical capacitance of the assembly depends upon: (a) the area of electrodes exposed to the electrostatic field, which is directly proportional to the length of the inner electrode; (b) the spacing between the inner and outer electrodes; (c) the dielectric constant of the insulating fluid between the inner and outer electrodes, and the length of connecting lead within the sealed channel 13 in the outer container.

The voltage breakdown rating depends upon the spacing between the inner and outer electrodes of the capacitor and the dielectric strength of the insulation on the connecting lead to the inner electrode.

Figure 2:
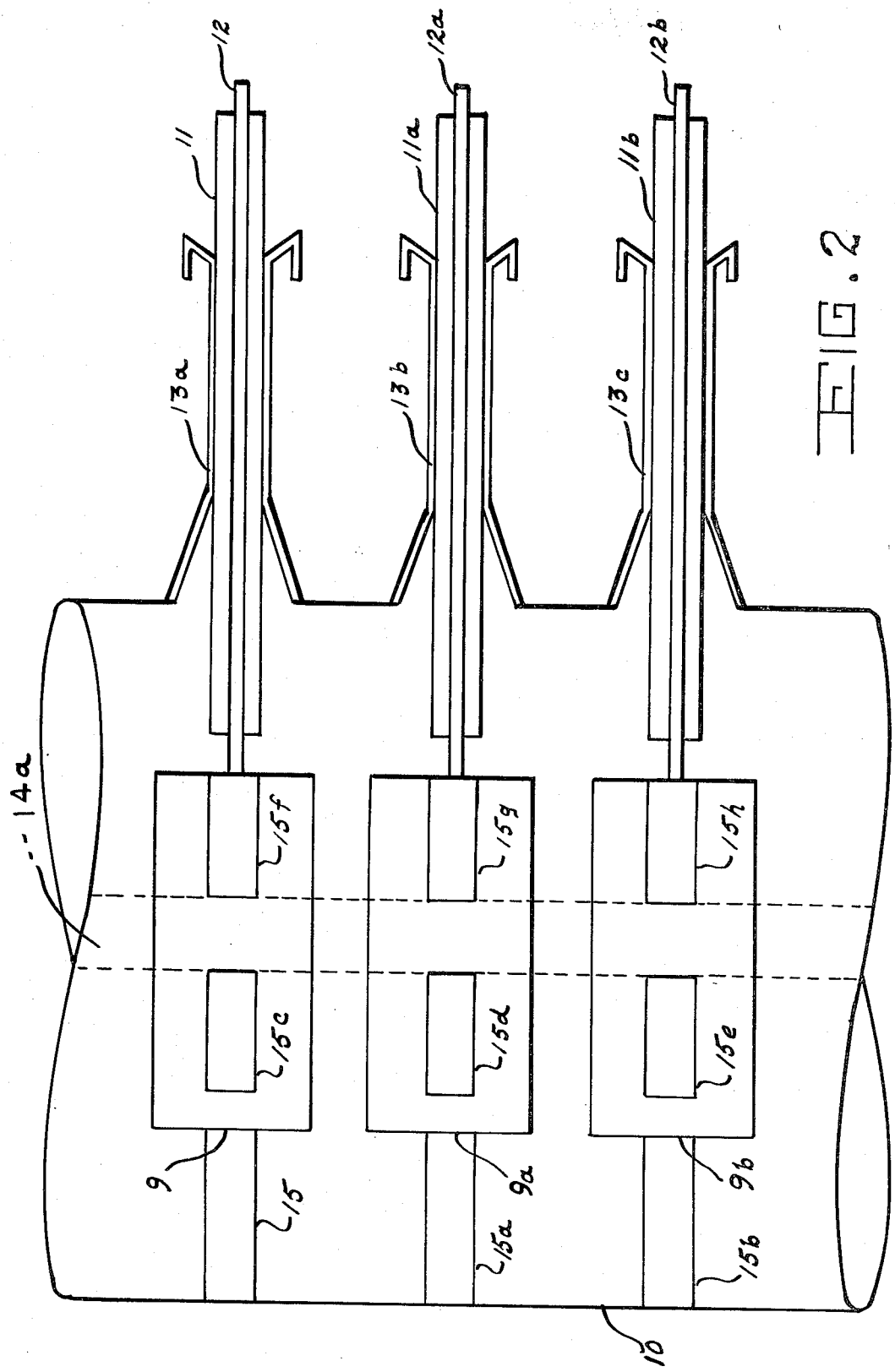
FIG. 2 shows a side view of FIG. 1 in a multisection version.

The multisection version of this high voltage capacitor as shown in FIG. 2 (side cutaway view) is a longitudinal extension of the single section version. It is comprised of a multiplicity of identical internal electrodes 9, 9a, 9b displaced longitudinally along the central axis of outer container electrode 10. Outer electrode 10 also serves as a container for dielectric fluid. Each of inner electrodes 9, 9a, 9b is provided with its own associated connecting lead 12, 12a and 12b, insulated with polyethylene 11, 11a and 11b, respectively, through liquid sealed channels 13a, 13b, and 13c respectively. Central suppport 14a can be used for added stability in conjunction with insulating spacer blocks 15 through 15e, or as an actuating bar in a variable capacitance version.

The multisection embodiment has the unique capability to distribute high voltage (e.g., 200 KV) trigger pulses to a multilevel switching spark gap such as those employed in high power radar modulators by way of connections 12, 12a, 12b, etc. The compact capacitor is useable to 250 KV and its cylindrical shape minimizes corners that require special treatment to avoid high voltage breakdown.

It is noted because of the unique arrangement of the elements of the high voltage capacitor the dielectric can be easily removed for replacement and servicing electrodes or modification thereof. The use of liquid dielectric enabling evaluation with many different materials. The effective area of the internal electrodes can be changed by making them of two telescoping cylinders. This permits the capacitance of all sections to be varied by an actuating bar through the center of the assembly. It is also emphasized that the oil dielectric is self healing in event of a momentary breakdown.

What is claimed is:

1. A high voltage capacitor being comprised of a single external cylindrical electrode having sealed ends also serving as a sealed container, a series of cylindrical inner electrodes longitudinally displaced along the axis within said external cylindrical electrode, first insulating means to support said series of cylindrical inner electrodes, second insulating means to space such series of cylindrical inner electrodes from said single external cylindrical electrode and also from said first insulating support means while simultaneously permitting vibration-free operation, a sealed channel through the wall of said external cylindrical electrode for each one of said series of cylindrical inner electrodes, an insulated conductor through each one of the sealed channels to make electrical connection to each one of said series of inner cylindrical electrodes, and a dielectric insulating fluid filling said single external cylindrical electrode.

2. A high voltage capacitor as described in claim 1 wherein said first insulating means for support consists of a centrally disposed single rod.

3. A high voltage capacitor as described in claim 1 wherein said dielectric insulating fluid consists of oil.

* * * * *